Jan. 14, 1958   F. F. WHITE, JR   2,819,610
VISCOSIMETER PROBE
Filed May 31, 1955
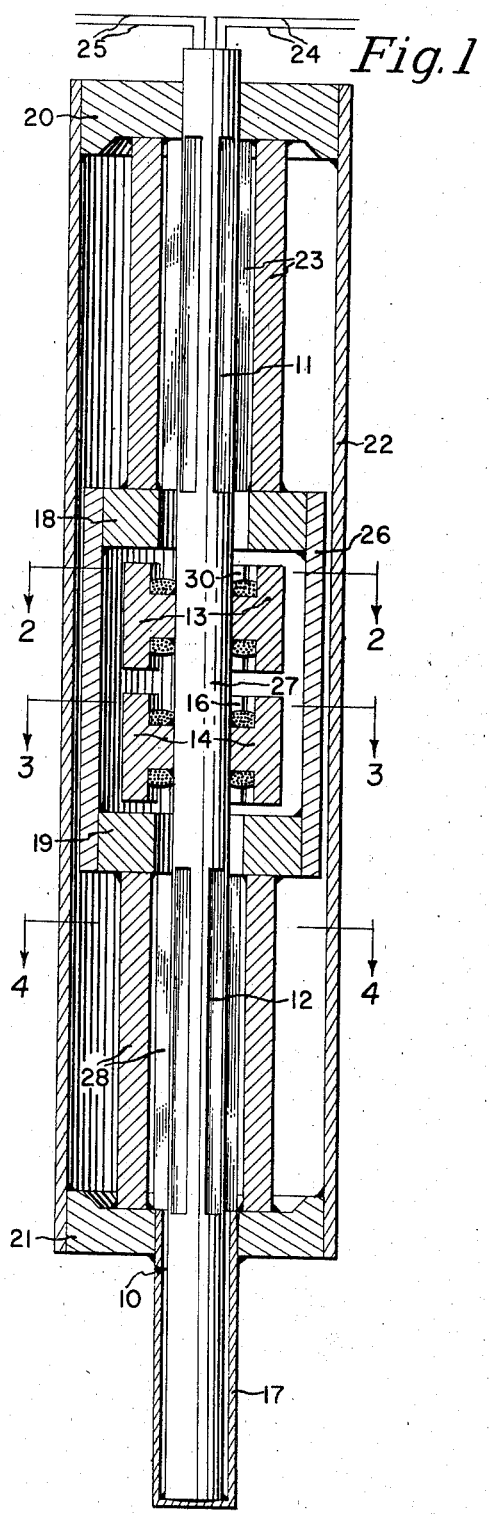
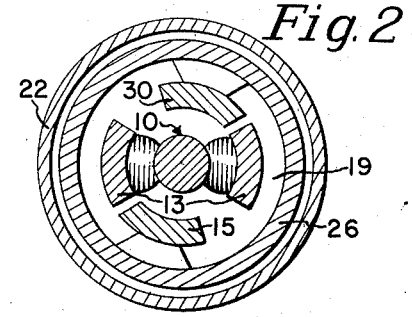
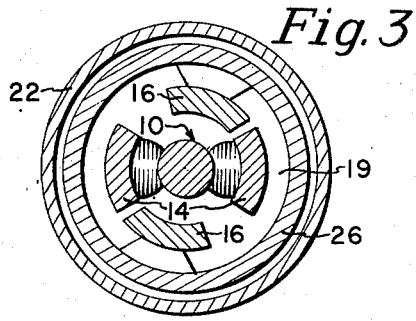
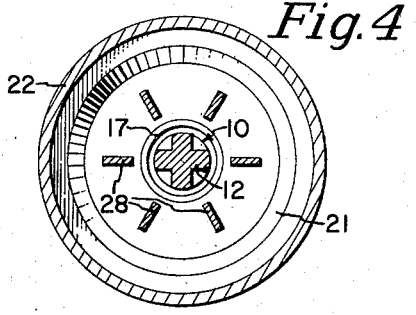
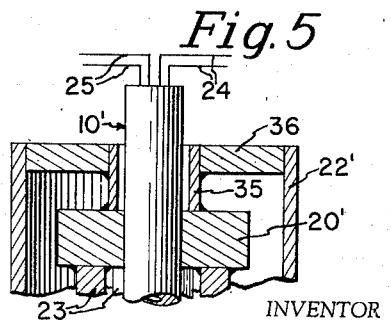
INVENTOR
FREDERICK F. WHITE, JR.
BY Robert J. Reichert
ATTORNEY United States Patent Office 2,819,610
Patented Jan. 14, 1958

2,819,610

VISCOSIMETER PROBE

Frederick F. White, Jr., Wilmington, Del., assignor to E. I. du Pont de Nemours and Company, Wilmington, Del., a corporation of Delaware Application May 31, 1955, Serial No. 512,140

7 Claims. (Cl. 73—59)

My invention is an oscillatory viscosimeter probe of the type adapted to give continuous viscosity readings.

For all practical purposes the viscosity of a liquid is proportional to a function of its damping rate on a torsionally oscillating probe submerged in the liquid. Therefore, viscosity can be ascertained readily by measuring this damping rate.

Heretofore, several types of torsional oscillatory probes for measuring the viscosity of liquids have been designed. However, these have been somewhat unsatisfactory. Some of these torsional probes have extremely high resonant frequencies. The damping rate of a liquid on an oscillating probe varies directly with the frequency of oscillation. It has been observed that a probe oscillating at high frequency in a relatively viscous liquid is damped too rapidly to give a satisfactory measurement of the damping rate. Consequently torsional probes of high resonant frequency have proven relatively unsatisfactory, particularly for use with liquids of high viscosity.

To decrease the resonant frequency, less rigid probes have been used. These have proven unsatisfactory either because transverse vibration as well as torsional vibration is induced in the probes or because their vibration is damped too fast due to their lack of stiffness.

Those prior art torsional probes that are enclosed for complete submersion in the liquid have still another disadvantage. The probe driving means, usually being secured to the casing, not only causes oscillation of the probe but also causes a reactive oscillation of the probe casing. This reactive oscillation, of course, is damped by the liquid, thereby introducing errors in the output signal.

I have discovered a new type of viscosimeter probe that oscillates in the torsional mode without any reactive oscillation in the probe casing. Any desired length of my probe can be exposed to the liquid. Therefore my probe can operate at low resonant frequencies without excessively fast damping even when it is being used to measure viscosities as high as 10,000 centipoise or greater. Furthermore, no substantial transverse oscillations are induced in my probe.

In order that the invention may be understood more readily, reference is made to the drawings in which:

Figure 1 is a vertical sectional view taken axially thru the preferred species of my probe;

Figure 2 is a horizontal sectional view taken along line 2—2 of Figure 1;

Figure 3 is a horizontal sectional view taken along line 3—3 of Figure 1;

Figure 4 is a horizontal sectional view taken along line 4—4 of Figure 1; and

Figure 5 is a vertical sectional view taken axially thru the upper portion of another species of my probe.

Referring now to the drawings, the probe of my invention comprises a probe rod system comprising a cylindrical probe rod 10, drive coils 14, pick-up coils 13 and a contact cylinder 17. The probe rod has an upper section 11, a longitudinal central section 27 and a lower section 12, all of which are in axial alignment and rigidly attached together. The central section 27 preferably is made of ferro-magnetic material. The upper and lower sections 11 and 12 as shown are splined, such as to a cruciform cross section, to give a lower natural frequency of torsional vibration without excessive sacrifice in transverse stiffness.

The upper splined section 11 preferably has the same overall torsional stiffness as the lower splined section 12 plus the contact cylinder 17. The probe rod system preferably has a natural frequency of torsional vibration in the range of about 60 to 1000 cycles per second, with the maximum amplitude being at central section 27.

Drive coils 14 and pick-up coils 13 are wound on ferromagnetic cores that are securely mounted on the central section 27 of the probe rod system substantially at the point of maximum amplitude vibration of the system. Leads 24 and 25, which pass through the center of the upper rod section, connect the drive and pick-up coils respectively to a pulse generator and a signal indicator, neither of which are shown.

The contact cylinder 17 is a thin-walled metal cylinder surrounding the lower part of the probe rod. It is closed at the lower end, which is rigidly secured in axial alignment to the bottom of rod section 12. The upper end of cylinder 17 is secured to the lower end plate 21. The outer surface of the contact cylinder comes in contact with the liquid. This is the only oscillating surface that contacts the liquid. Preferably, the contact cylinder is of greater stiffness per unit length, such as 10–100 fold or more, than the rod section 12 so that the contact surface presents relatively small amplitude oscillations to the liquid.

The probe rod system is rigidly anchored to the end plates 20 and 21 at node points, one being at the upper end of contact cylinder 17 and the other near the upper end of the probe rod 10. These plates in conjunction with casing 22 and contact cylinder 17 form a sealed shell for the inner parts of the probe.

A reactive spring system is positioned within casing 22 axially surrounding the probe rod system, and is of generally cylindrical construction. It comprises upper and lower cylindrical torsional spring sections 23 and 28, a central inertia section 26, magnet pole pieces 15 and 30, and coupling elements 16.

The upper and lower spring sections are a series of vertically disposed ribs describing a cylinder axially surrounding the probe rod system. The spring sections are positioned in axial alignment and preferably are of overall equal torsional rigidity. The entire reactive spring system comprising sections 23, 28 and 26 has the same torsional rigidity and natural frequency of torsional vibration as does the probe rod system.

The lower end of the spring element 28 is a node point and is anchored to end plate 21; the upper end of spring element 23 is a node point and is anchored to the end plate 20; and the inner ends of spring elements 23 and 28 are anchored to plates 18 and 19 of the inertia section 26, a section of maximum amplitude torsional vibration of the reactive spring system.

The pole pieces 15 and 30 are rigidly secured to the inertia section 26 and are positioned so that the flux field of the magnet couples with the pick-up coil 13. Therefore torsional movement of the pick-up coil with respect to the pole pieces and the inertia section 26 induces an electric signal in the pick-up coil proportional in amplitude to the movement of the pick-up coil.

The coupling elements 16 are also secured to the inertia section 26 and are in the magnetic circuit of the drive coil cores, along with cylinder 26. As can be seen from Figure 2, coupling elements 16 are positioned one adjacent but not touching each drive coil core. The coupling elements and drive coils are offset in different radial planes so that the passage of an electric drive pulse thru the drive coils induces torsional motion of the probe rod system relative to the reactive spring system. The coupling elements do not contact the drive coil cores even under maximum driving pulse.

In operation, the probe is submerged so that the entire exposed surface of contact cylinder 17 is touching the liquid to be tested. The input leads 24 to the drive coils 14 are attached to a direct current pulse generator that is delivering fixed amplitude pulses preferably at a frequency in the range of about 0.1 to 50 cycles per second.

Each individual pulse thru the drive coils induces a fixed amplitude magnetic force between the drive coils and the coupling elements 16. This force causes a fixed amplitude torsional displacement between the probe rod system and the reactive spring system.

When the drive pulse ceases, the probe rod system and the reactive spring system oscillate in torsional modes of equal amplitude and frequency, but 180° out of phase. Since the probe rod and the reactive spring system are balanced as to torsional stiffness and natural frequency of vibration, the end plates are absolute node points so that there is no oscillatory motion applied thru the end plates to the probe casing.

The contact cylinder oscillates as part of the probe rod system. The liquid contacting the contact cylinder therefore damps the amplitude of oscillation of the entire probe rod system at a rate substantially dependent upon the viscosity of the particular liquid being tested.

Since the pick-up coils are attached to the probe rod system, they oscillate with it. By oscillating in the flux field of the magnetic pole pieces 15 and 30 attached to the reactive spring system (which is oscillating in the opposite direction), the pick-up coils develop a signal that is proportional to the relative amplitude of oscillation of the probe rod system with respect to the reactive spring system.

This signal from the pick-up coil can be used to indicate the oscillation damping by the liquid surrounding the contact cylinder. The average amplitude of this signal is inversely proportional to a function of the viscosity of the liquid being tested.

Since the actual signal from the pick-up coil in most instances will be relatively small, this signal usually is fed into an amplifier system of stable characteristics and then to an average amplitude indicator of some conventional type. After calibrating the indicator by measuring the signal with liquids of known viscosities, accurate measurements of unknown liquids over an extremely wide range of viscosities can be made using this type apparatus.

My apparatus is subject to many modifications. For example, cylindrical casing 22', as shown in Figure 5, need not be secured directly to the outer end plates. Better isolation of the vibrating systems from the cylindrical casing 22' is obtained when the casing is attached to a secondary end plate 36 that is attached to a cylindrical member 35, which in turn is attached to one of the end plates 20'. This arrangement can be used to decouple either or both of the end plates from the outer casing.

Likewise, the torsional cylindrical spring sections of the reactive spring section can take many forms. For example, these spring sections also can be thin-walled cylinders. Alternatively, the entire reactive spring system can comprise a long single cylinder with the magnet and coupling elements mounted centrally and internally thereof to give the required central inertia.

Although it is preferred that the upper and lower sections of the probe rod, and also the upper and lower cylindrical torsional spring sections, be of equal torsional stiffness, this is not essential. The torsional stiffnesses of the upper and lower sections of the probe rod can differ substantially, as can the torsional stiffnesses of the upper and lower torsional spring sections. It is, however, essential that the overall stiffness of the probe rod system be equal to that of the reactive spring system.

Also, any desired number of drive and pick-up coils can be used in conjunction with appropriate magnetic pole pieces and coupling elements. Of course, the permanent magnet pole pieces can be replaced with electro magnet pole pieces if desired.

Likewise, it is not absolutely essential that the probe rod of the probe rod system be splined, although this is highly preferred to permit the use of low resonant frequencies without sacrificing too much transverse stiffness in the rod. Also the central inertia section of the probe rod need not be made of ferro-magnetic material, in which case it is desirable to provide a ferro-magnetic path of some type directly between the drive coil cores and also between the pick-up coil cores.

The contact cylinder can be any desired stiffness and can be varied widely in length and diameter to expose any desired surface area to the damping effects of the liquids. Frequently it is desirable to attach an auxiliary damping surface, such as a cylinder, to the bottom of the contact cylinder to give an increased damping area.

In assembling my probe, it is the usual practice first to spline the main rod in the upper and lower sections. Preferably the stiffness of the upper section is made equal to the stiffness of the lower section plus the contact cylinder. The probe rod system, comprising the probe rod, the drive and pick-up coils, and the contact cylinder, is then assembled.

Torsional cylindrical spring sections for the reactive spring system are then selected. Preferably they are equal in stiffness to each other. A central inertia section is then constructed to have approximately the correct inertia to give a reactive spring system having the same resonant frequency as the probe rod system. The reactive spring system is then assembled.

The resonant frequency of vibration of the reactive spring system is then matched accurately to the resonant frequency of the probe rod system by varying the inertia of the central inertia section of the reactive spring system and/or the stiffness of one or both of the splined probe rod sections. This can best be accomplished as follows.

The probe, except for the outer casing, is assembled and suspended in air from wires attached to the two end plates. The drive coil is connected to the pulse generator, and the pick-up coil to a signal indicator, preferably an oscilliscope. The rate of damping of the pick-up coil signal is noted. The end plates are then held firmly, such as in the hands or in a viscous fluid, and the rate of damping of the signal again noted.

If the end plates are absolute node points—if the resonant frequencies of the probe rod system and the reactive spring system are equal—the holding of the end plates will have no effect on the rate of damping of the signal. However, this is seldom the case initially. The rate of damping is usually much faster when the end plates are being held, indicating a mismatch in the resonant frequencies of the two oscillating systems.

This mismatch corrected by changing the inertia of the central inertia member and/or the stiffness of the probe rod sections until the holding of the end plates has no effect on the rate of damping of the signal. Once this has been accomplished, the outer casing can be put in place, and the probe is ready for calibration and use.

I claim:

1. A viscosimeter probe comprising two end plates held apart in a fixed relationship and:

(1) A probe rod system comprising
   (a) a probe rod, and
   (b) surrounding a portion of the probe rod, a contact cylinder, a surface of which contacts the liquid being measured, having a closed end rigidly secured to the bottom of the probe rod, with the other end of the cylinder being anchored to the nearer end plate, and (c) drive and pick-up coils mounted on the probe rod substantially at a point of maximum amplitude torsional oscillation, said probe rod system being anchored to two end plates at said two node points, one such node point being that end of the contact cylinder that is not secured to the probe rod and the other such node point being near the upper end of the probe rod;

(2) A reactive spring system having substantially the same torsional rigidity and natural frequency of torsional vibration as the probe rod system, said reactive spring system comprising (a) two torsional spring elements positioned one above the other and surrounding the probe rod system, the bottom end of the lower spring element and the upper end of the upper spring element being anchored to said two end plates and the other ends of said spring elements being anchored to an inertia section, and (b) An inertia section positioned between said spring elements, said inertia section comprising (i) a magnet, the flux field of which is coupled with the pick-up coil so that relative torsional movement of the pick-up coil with respect to the inertia section induces a signal voltage in the pick-up coil, and (ii) ferro-magnetic coupling elements in a magnetic circuit wtih the drive coil and positioned adjacent to and in the plane of movement of the drive coil but in a different radial plane so that the passage of an electric drive pulse thru the drive coil causes relative torsional displacement of the reactive spring system with respect to the probe rod system;

(3) Means for connecting the drive coil with a source of pulsating electric current; and (4) Means for connecting the pick-up coil with a signal indicator.

2. A viscosimeter probe in accordance with claim 1 wherein said probe rod system has a natural frequency of torsional vibration in the range from about 60 to 1000 cycles per second.

3. A viscosimeter probe in accordance with claim 1 wherein the stiffness per unit length of the contact cylinder is at least 10 times that of the lower section of the probe rod.

4. A viscosimeter probe in accordance with claim 1 wherein at least part of the probe rod is splined.

5. A viscosimeter probe in accordance with claim 1 wherein an outer casing anchored to said two end plates surrounds and, in conjunction with said two end plates and the contact cylinder, forms a sealed shell for the probe rod system and the reactive spring system.

6. A viscosimeter probe comprising two end plates held apart in a fixed relationship and:

(1) A probe rod system comprising (a) a probe rod having a central ferro-magnetic section, and (b) surrounding a portion of the probe rod, a contact cylinder, a surface of which contacts the liquid being measured, having a closed end rigidly secured in axial alignment with the bottom of the probe rod, with the other end of the cylinder being anchored to the nearer end plate, and (c) driving and pick-up coils having ferro-magnetic cores mounted on the central ferro-magnetic section of the probe rod substantially at a point of maximum amplitude torsional oscillation, said probe rod system being anchored to two end plates at two node points, one such node point being that end of the contact cylinder that is not secured to the probe rod and the other such node point being near the upper end of the probe rod;

(2) A reactive spring system having substantially the same torsional rigidity and natural frequency of torsional vibration as the probe rod system, said reactive spring system comprising (a) two cylindrical torsional spring elements of equal overall torsional stiffness positioned in axial alignment one above the other and surrounding the probe rod system, the bottom end of the lower spring element and the upper end of the upper spring element being anchored to said two end plates and the other ends of said spring elements being anchored to an inertia section, and (b) an inertia section positioned in axial alignment between said spring elements and surrounding the probe rod system, said inertia section comprising (i) a magnet, the flux field of which is coupled with the pick-up coil so that relative torsional movement of the pick-up coil with respect to the inertia section induces a signal voltage in the pick-up coil, and (ii) ferro-magnetic coupling elements in a magnetic circuit with the drive coil and positioned adjacent to and in the plane of movement of the drive coil but in a different radial plane so that the passage of an electric drive pulse thru the drive coil causes relative torsional displacement of the reactive spring system with respect to the probe rod system;

(3) Means for connecting the drive coil with a source of pulsating electric current; and (4) Means for connecting the pick-up coil with a signal indicator.

7. A viscosimeter probe comprising two end plates held apart in a fixed relationship and:

(1) A probe rod system comprising (a) a probe rod and (b) surrounding a portion of the probe rod, a contact cylinder, a surface of which contacts the liquid being measured, having a closed end rigidly secured to the bottom of the probe rod with the other end of the cylinder being anchored to the nearer end plate and (c) drive and pick-up coils mounted on the probe rod substantially at a point of maximum amplitude torsional oscillation, said probe rod system being anchored to said two end plates at two node points, one such node point being that end of the contact cylinder that is not secured to the probe rod and the other such node point being near the upper end of the probe rod;

(2) A reactive spring system having substantially the same torsional rigidity and natural frequency of torsional vibration as the probe rod system, said reactive spring system comprising (a) a torsional spring element surrounding the probe rod system, the ends of said spring element being anchored to two end plates, the portion of said spring system surrounding the point of maximum amplitude torsional oscillation of the probe rod system being an inertia section comprising (i) a magnet the flux field of which is coupled with the pick-up coil so that relative torsional movement of the pick-up coil with respect to the inertia section induces a signal voltage in the pick-up coil, and (ii) ferro-magnetic coupling elements in a magnetic circuit with the drive coil and positioned adjacent to and in the plane of movement of the drive coil but in a different radial plane so that the passage of an electric drive pulse through the drive coil causes relative torsional displacement of the reactive spring system with respect to the probe rod system;

(3) Means for connecting the drive coil with a source of pulsating electric current; and (4) Means for connecting the pick-up coil with a signal indicator.

References Cited in the file of this patent

UNITED STATES PATENTS

| | | |
|---|---|---|
| 2,142,854 | La Pierre | Jan. 3, 1939 |
| 2,550,052 | Fay | Apr. 24, 1951 |
| 2,633,016 | Millington | Mar. 31, 1953 |
| 2,696,735 | Woodward | Dec. 14, 1954 |
| 2,701,469 | Burns | Feb. 8, 1955 |